Dec. 29, 1959  E. R. ALLER  2,919,158
HOPPERS FOR FINELY DIVIDED MATERIALS
Filed Nov. 19, 1956  2 Sheets-Sheet 1
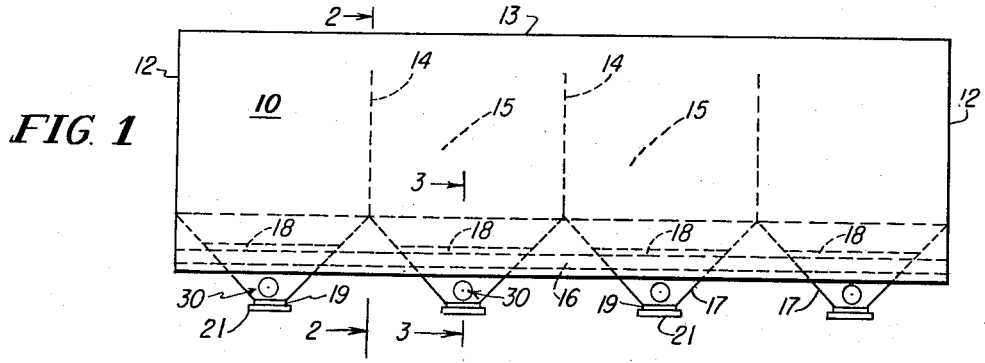
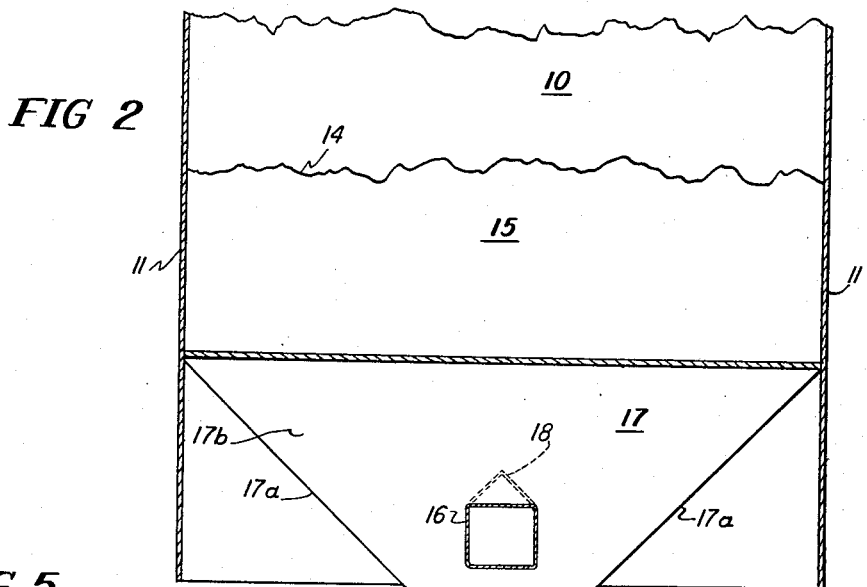
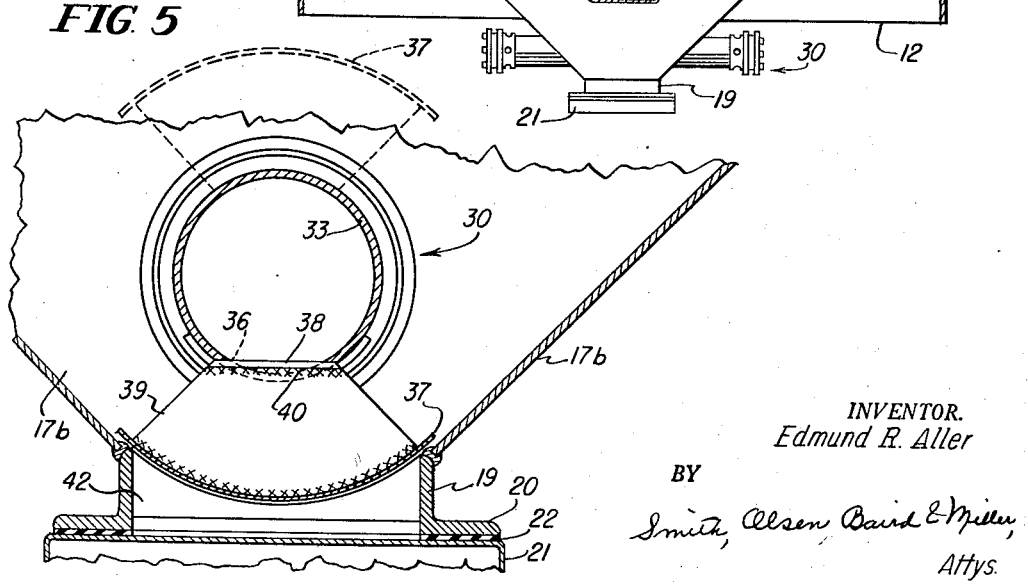
INVENTOR.
Edmund R. Aller
BY
Smith, Olsen, Baird & Miller,
Attys.

Dec. 29, 1959  E. R. ALLER  2,919,158
HOPPERS FOR FINELY DIVIDED MATERIALS
Filed Nov. 19, 1956  2 Sheets-Sheet 2
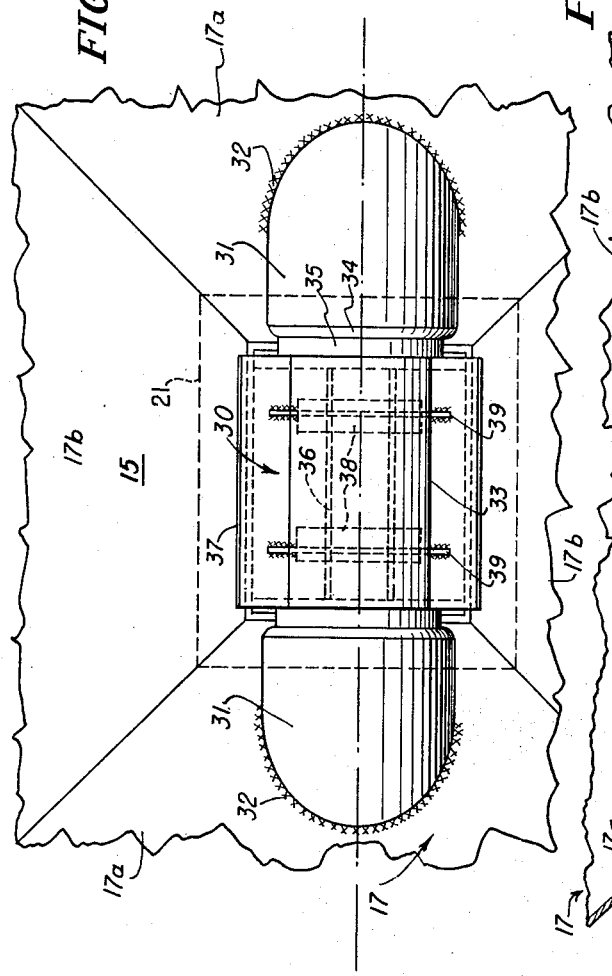
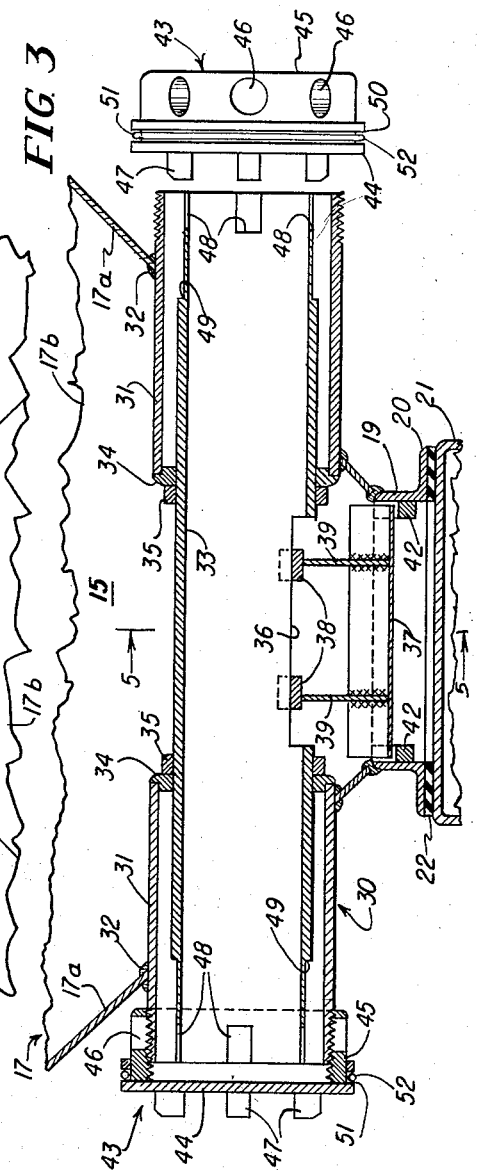
INVENTOR.
Edmund R. Aller
BY
Smith, Olsen, Baird & Miller,
Attys.

United States Patent Office 2,919,158
Patented Dec. 29, 1959

2,919,158

HOPPERS FOR FINELY DIVIDED MATERIALS

Edmund R. Aller, Gary, Ind., assignor to General American Transportation Corporation, Chicago, Ill., a corporation of New York Application November 19, 1956, Serial No. 623,060

15 Claims. (Cl. 302—52)

The present invention relates to hoppers for containing finely divided materials, and more particularly to such hoppers provided in vehicle bodies and incorporating combination pneumatic and gravity unloading facility for removing the contained materials therefrom.

In the shipment of certain finely divided or pulverulent materials vehicle bodies are employed that are constructed to define a number of individual hoppers containing corresponding portions of the lading, and each of the hoppers is provided with a bottom outlet that accommodates the discharge of the lading therefrom as required. Certain finely divided materials, such as malt, may be unloaded from the bottom of the hopper either by pneumatic action or by gravity action, whereby some installations employ pneumatic unloading equipment and other installations employ gravity unloading equipment. This situation renders it necessary for the carrier to provide either of the two types of hopper cars, as required by the shipper, and imposes upon the shipper the necessity of correlating the type of hopper car to be employed for the lading with the type of unloading equipment that is employed by the consignee. Of course, this results in confusion, delay and added expense in connection with such shipments.

Accordingly, it is a general object of the present invention to provide a hopper adapted to contain finely divided material and incorporating combination pneumatic and gravity unloading equipment for controlling the discharge of the material from the hopper.

Another object of the invention is to provide in a hopper for finely divided material, composite structure in the bottom of the hopper that may be selectively controlled to serve either as a pneumatic unloading tube for the material or as an operating element for a valve arrangement in a gravity unloading arrangement for the material.

A further object of the invention is to provide a hopper car including a body defining a plurality of individual hoppers, each incorporating combination pneumatic and gravity unloading equipment.

A still further object of the invention is to provide a combination pneumatic and gravity unloading device for a hopper adapter to contain finely divided material, wherein the device is of simple construction and arrangement lending the same to ready and economical use in railway hopper cars.

Further features of the invention pertain to the particular arrangement of the elements of the hopper, whereby the above-outlined and additional operating features thereof are attained.

The invention, both as to its organization and method of operation, together with further objects and advantages thereof, will best be understood by reference to the following specification taken in connection with the accompanying drawings, in which:

Figure 1 is a side elevational view of the body of a vehicle that is constructed to define a plurality of hoppers adapted to contain finely divided material;

Fig. 2 is an enlarged fragmentary lateral sectional view of the lower portion of the body, this view being taken in the direction of the arrows along the line 2—2 in Fig. 1;

Fig. 3 is a further enlarged fragmentary lateral sectional view, and exploded view, of the lower portion of the body, this view being taken in the direction of the arrows along the line 3—3 in Fig. 1 and illustrating the combination pneumatic and gravity unloading device provided in the bottom of the associated hopper incorporated in the body;

Fig. 4 is a fragmentary plan view, of the scale of Fig. 3, illustrating the laterally extending central portion of the combination pneumatic and gravity unloading device of Fig. 3; and Fig. 5 is a still further enlarged fragmentary longitudinal sectional view of the combination pneumatic and gravity unloading device, this view being taken in the direction of the arrows along the line 5—5 in Fig. 3.

Referring now to Figs. 1 and 2 of the drawings, there is illustrated a vehicle body 10 in the form of a railway car body, or the like, defining a plurality of hoppers, four hoppers being illustrated, and embodying the features of the present invention. More particularly, the vehicle body 10 comprises the usual elongated upstanding longitudinally extending side walls 11, the usual upstanding laterally extending end walls 12, the usual top wall 13, and particular bottom wall structure described more fully below. Also, three longitudinally spaced-apart and laterally extending divider walls 14 are arranged within the body 10 so as to define the four adjacent and substantially identical hoppers 15 therein. The hoppers 15 are adapted to contain finely divided material, such as malt, and the top wall 13 is provided with four hatch structures, not shown, accommodating the loading of the material into the four respective hoppers 15. Further the body 10 comprises the usual longitudinally extending center sill 16 arranged adjacent to the lower central portion thereof for the draw purpose, as well as the usual bolsters, not shown, for the mobile purpose.

As best shown in Figs. 1 to 4, inclusive, the bottom wall structure of the body 10 defines four downwardly tapered bottom walls 17 for respective ones of the four hoppers 15; and each of the bottom walls 17 comprises four individual wall panels, including a pair of side wall panels 17a and a pair of end wall panels 17b. The wall panels 17a and 17b are substantially identical, each having the general configuration of a trapezoid so that the bottom wall 17 has the general form of an inverted truncated four-sided pyramid. In the arrangement, the center sill 16 extends longitudinally successively through the four bottom walls 17 passing successively through the four corresponding hoppers 15. As indicated in Figs. 1 and 2, four upwardly tapered caps or deflectors 18 are respectively arranged in the four hoppers 15 upon the four top sections of the center sill 16 respectively passing through the four hoppers 15, so as to prevent retention or accumulation of small quantities of the lading upon these top sections of the center sill 16 incident to emptying of the hoppers 15, as explained more fully hereinafter. Specifically, each of the caps 18 comprises a pair of upwardly directed sides having sufficient pitch so that the lading slides downwardly thereon as the lading is emptied from the bottom of the associated hopper 15.

The bottom wall 17 of each of the hoppers 15 terminates in a bottom outlet that is surrounded by a substantially square downwardly projecting collar 19 that is provided with an outwardly directed surrounding flange 20 to which there is detachably secured a closure member or gate 21. The gate 21 is removably retained in place by suitable structure, not shown, and in sealed relation with the flange 20 with a sealing gasket 22 arranged therebetween, the sealing gasket 22 being formed of sheet rubber, or the like.

Also the bottom wall 17 of each of the hoppers 15 carries a laterally extending combination pneumatic and gravity unloading device, indicated generally by the reference numeral 30, and comprising a pair of laterally extending and aligned tubes 31 respectively projecting through a pair of aligned bottom openings respectively provided in the pair of bottom panels 17a and respectively secured in place in the bottom openings by welding, or the like, indicated at 32 in Figs. 3 and 4. The inner ends of the tubes 31 are disposed within the bottom of the associated hopper 15 and arranged in laterally spaced-apart relation with respect to each other; while the outer ends of the tubes 31 are respectively disposed exteriorly of the respectively adjacent bottom panels 17a of the hopper 15. Moreover, the laterally spaced-apart aligned inner ends of the tubes 31 are arranged above the bottom outlet into the hopper 15, as defined by the collar 19, and as normally closed by the gate 21, as best illustrated in Fig. 3.

Also the unloading device 30 comprises an inner laterally extending tube 33 arranged mutually within the tubes 31 and within the bottom of the hopper 15 and projecting over the bottom outlet defined by the collar 19, the inner tube 33 being rotatably mounted upon the outer tubes 31. Specifically, the inner ends of the two tubes 31 respectively carry two bearing rings 34 that respectively cooperate with two centering rings 35 carried by the tube 33 and arranged in laterally spaced-apart relation with respect to each other. A notch or cutout 36 is provided in an intermediate segmental portion of the tube 33 disposed between the centering rings 35, so that the interior of the tube 33 communicates with the bottom of the hopper 15. As best illustrated in Figs. 3, 4 and 5, a semi-cylindrical valve element 37 is arranged directly radially in spaced-apart relation with respect to the notch 36 formed in the central portion of the tube 33; which valve element 37 is rigidly secured to the tube 33 and rotatable therewith. Specifically, two laterally spaced-apart straps 38 are secured to the tube 33 in bridging relation with respect to the notch 36 formed in the central portion thereof; and the two straps 38 respectively carry two laterally spaced-apart and radially extending plates 39 that, in turn, are secured to the valve element 37. As shown in Fig. 5, the inner edge of the plate 39 may be secured to the strap 38 as by welding, indicated at 40, and the outer edge of the plate 39 may be secured to the valve element 37, as by welding, indicated at 41. The valve element 37 cooperates with the throat opening of the bottom outlet defined by the collar 19, and in order to insure a proper valve fit between the valve element 37 and the collar 19, a pair of laterally spaced-apart valve seats 42 are respectively carried by two opposed interior portions of the collar 19. The valve element 37 has a normally closed position with respect to the collar 19, illustrated in solid lines in Fig. 5; and also the valve element 37 has a normally open position with respect to the collar 19, illustrated in dotted lines in this figure. The normally closed position and the normally open position of the valve element 37 are disposed 180° with respect to each other, and the valve element 37 may be selectively moved between its two positions mentioned by corresponding rotation of the tube 33 within the tubes 31.

In view of the foregoing description of the construction and arrangement of the device 30, it will be understood that the interior of the tube 33 is always in communication with the bottom of the hopper 15 through the notch 36 formed in the tube 33 and regardless of the rotary position of the tube 33; while the rotary position of the tube 33 directly controls the position of the valve element 37 with respect to the collar 19 so as selectively to control the opening and closing of the bottom outlet into the hopper 15, after removal of the gate 21. Also when the valve element 37 occupies its fully open position with respect to the collar 19, it is disposed above the notch 36 provided in the central portion of the tube 33 so as to prevent the normal direct entry of the lading into the interior of the tube 33. Furthermore, in the movement of the valve element 37 between its closed and open positions with respect to the collar 19, the leading edge of the valve element 37 cuts through the lading contained in the bottom of the hopper 15 so as to minimize the torque that must be exerted upon the tube 33 in order to effect rotation thereof.

In the construction of the device 30, the outer end of each of the tubes 31 is threaded and receives a removable cap 43 that also comprises a wrench. Specifically, the cap 43 comprises an end wall 44 carrying a tubular side wall 45 that is internally threaded to engage the externally threaded outer end of the associated tube 31. Also the tubular side wall 45 has a number of aligned pairs of radially spaced-apart holes 46 formed therein that are normally closed when the cap 43 occupies its normal position upon the outer end of the tube 31. The outer surface of the end wall 45 also carries a number of outwardly directed pairs of radially spaced-apart lugs 47 that are adapted to be received in corresponding notches 48 formed in the extreme outer ends of the tube 33. Also each outer end of the tube 33 is provided with a section of reduced wall thickness, so as to provide shouldered sections 49 on the opposite ends thereof. Finally, a ring 50 is carried by the tubular side wall 45 in spaced relation with respect to the periphery of the end wall 44 so as to provide an annular groove 51 therebetween in which a retaining ring 52 is arranged; which retaining ring 52 is normally connected by a suitable length of chain, not shown, to the adjacent bottom wall 17 of the associated hopper 15. This arrangement accommodates ready removal of each of the caps 43 with respect to the outer end of the associated tube 31, without loss of the removed cap 43 by virtue of the attachment of the cap 43 to the bottom wall 17 of the associated hopper 15 by the mentioned section of chain, not shown.

Considering now the normal use of the vehicle body 10, the gates 21 are normally secured in place with respect to the associated flanges 20, and the caps 43 are normally secured in place with respect to the adjacent ends of the tubes 31, as shown at the left-hand side of Fig. 3 of the drawings. Also, at this time, the valve element 37 normally occupies its closed position with respect to the associated collar 19, as illustrated in Figs. 3, 4 and 5 of the drawings. At this time, the top hatch doors, not shown, provided in the top wall 13, are operated into their open positions and the lading is loaded therethrough into the interior of the vehicle body 10 filling the four hoppers 15 illustrated. Of course, the top hatch doors, not shown, are subsequently returned into their closed positions and locked therein in sealed relation, in the usual manner. At this time, the lading, malt or other finely divided material, has been loaded into the vehicle body 10 and all of the openings into the vehicle body 10 are closed so that the lading may be transported to its destination.

When the vehicle body 10 arrives upon the premises of the consignee, the removal of the lading from the hoppers 15 is dependent upon the type of unloading equipment that is employed by the consignee, and it is mentioned that either a pneumatic action or a gravity action may be employed.

First assuming that each of the hoppers 15 is to be unloaded by pneumatic action, one of the caps 43 is removed from the outer end of the associated one of the tubes 31, and the adjacent outer end of the usual pneumatic unloading hose is positioned between the outer ends of the tubes 33 and 31 and secured in place in the usual manner. At this time, the interior of the hopper 15 communicates via the notch 36 with the interior of the tube 33, whereby it is apparent that the production of a suction action within the tube 33 will cause the finely divided or pulverulent material to move from the bottom of the hopper 15 through the notch 36 into the interior of the tube 33 and therefrom through the one outer end of the tube 33 into the associated suction hose. In conjunction with the pneumatic unloading, it is noted that the cap 43 at the other end of the tube 31 is partially unscrewed to accommodate the admission of a controlled amount of conveying air through the holes 46 therein. A careful control can be exercised in this regard with the use of a conventional bar placed as a lever between the lugs 47 carried by the cap 43. It is further mentioned that in accordance with normal practice, four suction hoses are respectively connected to the four of the devices 30 as described above, and that the four hatch doors, not shown, provided in the top wall 13 are normally operated into their open positions at this time, so as to facilitate the flow of the finely divided material through the four suction hoses mentioned.

Now assuming that each of the hoppers 15 is to be unloaded by gravity action, one of the caps 43 is removed from the outer end of the associated one of the tubes 31; the removed cap is then reversed, as indicated at the right-hand side of Fig. 3, to provide a wrench; and then the cap 43 is inserted into the associated outer end of the tube 31 so that the lugs 47 engage the notches 48 provided in the associated outer end of the tube 33. At this time, rotation of the tube 33 may be effected by rotating the cap 43 employed as a wrench, as described above and utilizing the same lever previously mentioned. Of course, the tube 33 is rotated so that the valve element 37 is rotated from its normally closed position into its normally open position with respect to the collar 19, the normally open position of the valve element 37 being indicated in Fig. 5 in dashed lines. Of course, at this time, the gate 21 is also removed from the associated flange 20 so as to place the bottom outlet in the bottom of the hopper 15 into communication with the exterior. At this time, the lading in the hopper 15 falls by the action of gravity through the bottom outlet and through the collar 19 to the exterior, and the valve element 37 in its fully open position prevents any substantial amount of the lading from falling through the notch 36 into the interior of the tube 33. Of course, when the vehicle body 10 is unloaded by gravity action, each of the four devices 30 is operated in the manner described above, and each of the four hatch doors is normally operated into its open position to facilitate the flow of lading from the associated ones of the four hoppers 15.

After the vehicle body 10 has been unloaded employing either the pneumatic action or the gravity action separately described above, the parts of each of the devices 30 are normally returned back into their normal positions, as illustrated in Figs. 3, 4 and 5; whereby the vehicle body 10 may be returned to the carrier for further use.

It is reiterated that while the center sill 16 passes through the lower portion of each one of the hoppers 15, there is no substantial accumulation of the lading thereupon incident to an unloading operation by virtue of the provision of the cap 18 upon the section of the center sill 16 extending through the associated hopper 15. Moreover, it is noted that during an unloading operation, certain of the caps 43 while removed from the outer ends of the tubes 31, are not lost, since they are secured or anchored flexibly to the associated bottom wall 17 of the hopper 15, by the associated retaining ring 50 and associated section of chain length, not shown.

In view of the foregoing, it is apparent that there has been provided in a vehicle body including a number of hoppers, a corresponding number of combination pneumatic and gravity unloading devices, whereby the hoppers may be unloaded of the finely divided lading therein by pneumatic action or by gravity action in a simple manner at the election of the consignee and dependent upon the type of equipment that is employed at the particular location.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In combination, a hopper adapted to contain finely divided material and provided with a bottom outlet, a valve element arranged in the lower portion of said hopper in cooperating relation with said bottom outlet and selectively movable between closed and open positions with respect thereto, whereby the material in said hopper may be removed therefrom through said bottom outlet when it is open, an opening arranged in the lower side of said hopper and disposed above said bottom outlet, a tube arranged in said opening and mounted upon said hopper for relative movements with respect thereto, a first portion of said tube being disposed interiorly of said hopper and positioned over said bottom outlet and a second portion of said tube being disposed exteriorly of said hopper, an operative connection between said valve element and said first portion of said tube, whereby said valve element may be selectively moved between its closed and open positions with respect to said bottom outlet in response to corresponding movements of said tube with respect to said hopper, said first portion of said tube communicating directly with the lower portion of said hopper and said second portion of said tube communicating directly with the exterior, so that said tube provides a passage therebetween independent of said bottom outlet, and mechanism for selectively closing and opening said passage, whereby the material in said hopper may be removed therefrom through said passage when it is open.

2. The combination set forth in claim 1, wherein said tube is mounted upon said hopper for rotary movements about the longitudinal axis of said tube.

3. The combination set forth in claim 1, wherein said mechanism includes a removable cap disposed exteriorly of said hopper and cooperating with said second portion of said tube.

4. In combination, a hopper adapted to contain finely divided material and provided with a bottom outlet, a valve element arranged in the lower portion of said hopper in cooperating relation with said bottom outlet and selectively movable between closed and open positions with respect thereto, whereby the material in said hopper may be removed therefrom through said bottom outlet when it is open, an opening arranged in the lower side of said hopper and disposed above said bottom outlet, a tube arranged in said opening and mounted upon said hopper for rotary movements about its longitudinal axis, a first portion of said tube being disposed interiorly of said hopper and positioned over said bottom outlet and a second portion of said tube being disposed exteriorly of said hopper, a rigid connection between said valve element and said first portion of said tube, whereby said valve element may be selectively moved between its closed and open positions with respect to said bottom outlet in response to corresponding rotary movements of said tube about its longitudinal axis, said first portion of said tube communicating directly with the lower portion of said hopper and said second portion of said tube communicating directly with the exterior, so that said tube provides a passage therebetween independent of said bottom outlet, and mechanism for selectively closing and opening said passage, whereby the material in said hopper may be removed therefrom through said passage when it is open.

5. The combination set forth in claim 4, wherein said second portion of said tube carries structure adapted to receive a cooperating torsion tool.

6. The combination set forth in claim 4, wherein said valve element is of plate-like form having unobstructed edges that are movable edgewise through the material in said hopper as said valve element is moved between its closed and open positions with respect to said bottom outlet.

7. In combination, a hopper adapted to contain finely divided material and provided with a bottom outlet, a valve element arranged in the lower portion of said hopper in cooperating relation with said bottom outlet and selectively movable between closed and open positions with respect thereto, whereby the material in said hopper may be removed therefrom by the action of gravity through said bottom outlet when it is open, a pair of aligned openings respectively arranged in the lower sides of said hopper and disposed above said bottom outlet, a tube projecting through said openings and extending over said bottom outlet and mounted upon said hopper for rotary movements about its longitudinal axis, a rigid connection between said valve element and the adjacent intermediate portion of said tube, whereby said valve element may be selectively moved between its closed and open positions with respect to said bottom outlet in response to corresponding rotary movements of said tube about its longitudinal axis, said intermediate portion of said tube having a hole therein communicating directly with the lower portion of said hopper and the opposite ends of said tube being disposed exteriorly of said hopper and communicating directly therewith, so that said tube provides a passage therebetween independent of said bottom outlet, and two mechanisms respectively operatively associated with opposite ends of said tube and each selectively operative into closed and open positions, one of said mechanisms in its open position accommodating the introduction of exterior conveying air into the associated one end of said tube, and the other of said mechanisms in its open position accommodating the application of suction in the associated other end of said tube, whereby the conveying air may move through said tube from said one end toward said other end and the material in said hopper may be drawn through said hole into said intermediate portion of said tube and may move with the conveying air out of said other end of said tube.

8. The combination set forth in claim 7, wherein said valve element is of plate-like form and is arranged in radial alignment with said hole, so that said valve element in its closed position is located below said hole and so that said valve element in its open position is located above said hole.

9. In combination, a hopper adapted to contain finely divided material and provided with a bottom outlet, a valve element arranged in the lower portion of said hopper in cooperating relation with said bottom outlet and selectively movable between closed and open positions with respect thereto, whereby the material in said hopper may be removed therefrom through said bottom outlet when it is open, an opening arranged in the lower side of said hopper and disposed above said bottom outlet, a first tube projecting through said opening and rigidly secured in place therein, the inner and outer ends of said first tube being respectively disposed interiorly and exteriorly of said hopper, a second tube arranged within said first tube and mounted thereupon for relative movements with respect thereto, an inner portion of said second tube being disposed interiorly of said hopper and positioned over said bottom outlet and an outer portion of said second tube being disposed exteriorly of said hopper, an operative connection between said valve element and said inner portion of said second tube, whereby said valve element may be selectively moved between its closed and open positions with respect to said bottom outlet in response to corresponding movements of said second tube with respect to said first tube, means for sealing said second tube with respect to said first tube, said inner portion of said second tube communicating directly with the lower portion of said hopper and said outer portion of said second tube communicating directly with the exterior, so that said tube provides a passage therebetween independent of said bottom outlet, and a detachable cap carried by said outer end of said first tube and enclosing said outer portion of said second tube, whereby said passage is respectively closed and opened when said cap is respectively placed and removed with respect to said first tube, and whereby the material in said hopper may be removed therefrom through said passage when said cap is removed with respect to said first tube.

10. The combination set forth in claim 9, wherein said second tube is mounted upon said first tube for rotary movements about the longitudinal axis of said second tube.

11. The combination set forth in claim 9, wherein an annular space is defined between said outer end of said first tube and said outer portion of said second tube and is adapted to receive the end of a suction conduit therein when said cap is removed with respect to said first tube for the purpose of creating a suction action in said outer portion of said second tube.

12. In combination, a hopper adapted to contain finely divided material and provided with a bottom outlet, a valve element arranged in the lower portion of said hopper in cooperating relation with said bottom outlet and selectively movable between closed and open positions with respect thereof, whereby the material in said hopper may be removed therefrom through said bottom outlet when it is open, a first tube projecting through an opening arranged in the lower side of said hopper and rigidly secured in place therein, a second tube arranged within said first tube and mounted thereupon for rotary movements with respect thereto, an operative connection between said valve element and the adjacent portion of said second tube, whereby said valve element may be selectively moved between its closed and open positions with respect to said bottom outlet in response to corresponding rotary movements of said second tube with respect to said first tube, means for sealing said second tube with respect to said first tube, said second tube providing a passage between the lower portion of said hopper and the exterior, a detachable cap carried by the exterior end of said first tube and enclosing the exterior end of said second tube, whereby said passage is respectively closed and opened when said cap is respectively placed and removed with respect to said first tube, and whereby the material in said hopper may be removed therefrom through said passage when said cap is removed with respect to said first tube, first parts carried by the exterior end of said second tube and accommodating rotation thereof with respect to said first tube, and second parts carried by the exterior of said cap and arranged to engage said first parts after removal of said cap from the exterior end of said first tube and reversal of said cap, whereby said cap also serves as a wrench to facilitate rotation movement of said second tube with respect to said first tube.

13. In combination, a hopper adapted to contain finely divided material and provided with a bottom outlet, a valve element arranged in the lower portion of said hopper in cooperating relation with said bottom outlet and selectively movable between closed and open positions with respect thereto, whereby the material in said hopper may be removed therefrom through said bottom outlet when it is open, a pair of aligned first tubes respectively projecting through a pair of aligned openings respectively arranged in the lower sides of said hopper and respectively rigidly secured in place therein, a second tube arranged within said first tubes and mounted thereupon for rotary movements with respect thereto and extending over said bottom outlet, a rigid connection between said valve element and the adjacent intermediate portion of said second tube, whereby said valve element may be selectively moved between its closed and open positions with respect to said bottom outlet in response to corresponding rotary movements of said second tube with respect to said first tubes, means for sealing said second tube with respect to said first tubes, the intermediate portion of said second tube having a hole therein communicating with the lower portion of said hopper, and a pair of mechanisms respectively carried by said pair of first tubes and each selectively operative into closed and open positions, one of said mechanisms in its open position accommodating the introduction of exterior conveying air into the associated one end of said second tube, and the other of said mechanisms in its open position accommodating the application of suction in the associated other end of said second tube, whereby the conveying air may move through said second tube from said one end thereof toward said other end thereof and the material in said hopper may be drawn through said hole into said tube and may move with the conveying air out of said other end of said second tube.

14. The combination set forth in claim 13, wherein each of said mechanisms includes a cap detachably carried by the exterior end of the associated one of said first tubes and enclosing the associated exterior end of said second tube.

15. In combination, a hopper adapted to contain finely divided material and provided with a bottom outlet, a valve element arranged in the lower portion of said hopper in cooperating relation with said bottom outlet and selectively movable between closed and open positions with respect thereto, whereby the material in said hopper may be removed therefrom through said bottom outlet when it is open, a pair of aligned first tubes respectively projecting through a pair of aligned openings respectively arranged in the lower sides of said hopper and respectively rigidly secured in place therein, a second tube arranged within said first tubes and mounted thereupon for rotary movements with respect thereto and extending over said bottom outlet, a rigid connection between said valve element and the adjacent intermediate portion of said second tube, whereby said valve element may be selectively moved between its closed and open positions with respect to said bottom outlet in response to corresponding rotary movements of said second tube with respect to said first tubes, means for sealing said second tube with respect to said first tubes, the intermediate portion of said second tube having a hole therein communicating with the lower portion of said hopper, and a pair of caps respectively detachably carried by the exterior ends of said first tubes and respectively enclosing the associated exterior ends of said second tube, one of said caps and the associated exterior end of one of said first tubes being provided with cooperating structure accommodating the introduction of a variable amount of exterior conveying air into the associated one end of said second tube, and the other of said caps being completely removable to accommodate the connection of a suction conduit to the associated other end of said second tube, whereby the conveying air may move through said second tube from said one end thereof toward said other end thereof and the material in said hopper may be drawn through said hole into said tube and may move with the conveying air out of said other end of said second tube.

References Cited in the file of this patent

UNITED STATES PATENTS

| | | |
|---|---|---|
| 808,089 | Hopkins et al. | Dec. 26, 1905 |
| 1,479,103 | Lyons | Jan. 1, 1924 |
| 1,654,050 | Page | Dec. 27, 1927 |
| 2,650,726 | Aller et al. | Sept. 1, 1953 |
| 2,789,739 | Aller | Apr. 23, 1957 |